Nov. 22, 1966  R. G. BOARD ETAL  3,286,946
RETRACTABLE SAFETY BELTS
Filed June 2, 1964  2 Sheets-Sheet 1
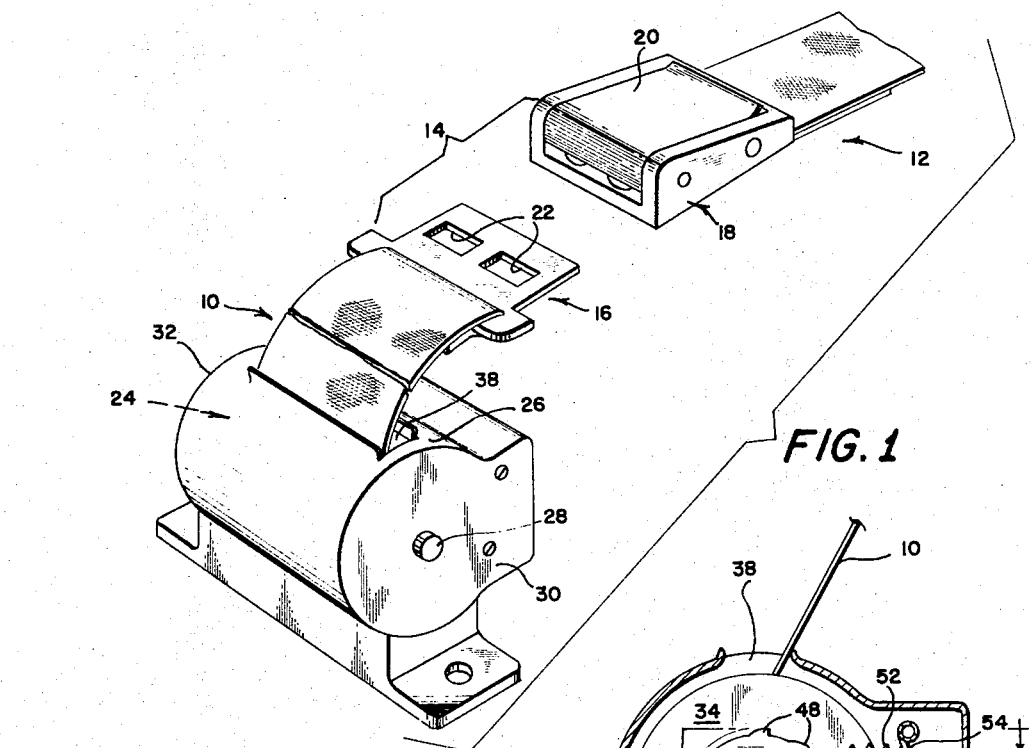
INVENTORS
RICHARD G. BOARD
NELSON H. SHAPIRO
BY Shapiro and Shapiro
ATTORNEYS

INVENTORS
RICHARD G. BOARD
NELSON H. SHAPIRO

BY *Shapiro and Shapiro*

ATTORNEYS

United States Patent Office 3,286,946
Patented Nov. 22, 1966

3,286,946
RETRACTABLE SAFETY BELTS
Richard G. Board, Bethesda, Md., and Nelson H. Shapiro, Hyattsville, Md. (7001 Old Cabin Lane, Rockville, Md. 20852)
Filed June 2, 1964, Ser. No. 371,986
7 Claims. (Cl. 242—107.2)

This invention relates to retractable safety belts and more particularly to so-called seat belts for use in automotive vehicles or the like.

A retractable seat belt presently in use comprises a pair of straps which carry the mating parts of a belt fastener couple. The tongue of the fastener couple is attached to the end of a strap which is wound upon a retracting reel mounted upon the floor at one side of the vehicle seat. One end of the other strap is threaded through the buckle to provide some excess, so that the effective length of the strap may be adjusted, and the other end is anchored to the floor at the other side of the seat. The strap associated with the tongue is kept relatively short and must be fully extended from the retracting reel when the belt is fastened in order to prevent further extension of the strap from the reel in a collision. Heretofore it has not been possible to provide a convenient foolproof means which would permit variable extension of the strap from the reel and yet automatic extension locking after withdrawal of the desired amount of strap. The strap associated with the buckle is not retractable and must be made long enough to permit substantial adjustment of the buckle position in order to accommodate the size and clothing of the user. This type of seat belt installation leaves much to be desired.

It is accordingly a principal object of the present invention to provide a retractable seat belt which avoids or substantially alleviates the disadvantages of the above-described prior retractable seat belt and which employs principles which are applicable to other types of seat belt installations, for example, those in which the vehicle seat can withstand collision forces, so that a single retractable strap may be anchored at each end to the seat, and those in which a retracting reel is employed at each side of the seat.

A more specific object of the invention is to provide a retractable seat belt or the like which may be readily extended to place the belt in user-restraining position but in which further extension is prevented automatically at the end of an interval of time commencing with the initial extension of the belt.

A further object of the invention is to provide a retracting reel for a seat belt or the like which permits ready extension of the belt from the reel initially but which is locked, so as to prevent further extension, at a predetermined time after initial extension of the belt.

Another object of the invention is to provide a reel of the foregoing type which permits retraction of the belt even after the reel is locked against belt extension.

Yet another object of the invention is to provide a retractable seat belt which is clamped automatically, so as to prevent extension of the belt, at the end of an interval of time commencing with initial extension of the belt.

Still another object of the invention is to provide a retractable seat belt of the foregoing type in which the clamp permits retraction of the belt even though the belt is locked against extension.

A still further object of the invention is to provide improved extension locking means for a retractable seat belt or the like, which permits retraction of the belt when the belt is locked against extension after initial extension to any desired length within a wide range of lengths.

A further object of the invention is to provide improved retractable seat belts which operate upon a time delay principle.

Another object of the invention is to provide a retractable seat belt employing a time delay device which is primed or set automatically or semi-automatically.

A more specific object of the invention is to provide a retractable seat belt of the foregoing type employing a time delay device which is primed automatically when the seat belt is moved in a predetermined direction.

Yet another object of the invention is to provide a retractable seat belt employing a time delay device which is primed automatically by a belt fastener part when the fastener part arrives at its fully retracted position.

Still another object of the invention is to provide a retractable seat belt employing a time delay device which is primed automatically in response to the effective increase in diameter of the belt rolled upon a retracting reel when the belt is retracted.

An additional object of the invention is to provide a retractable seat belt employing a time delay device which may be primed manually.

Briefly stated, and without intent to limit the scope of the invention, one embodiment of a retractable seat belt installation in accordance with the invention employs a pair of straps, one of which is wound upon a retracting reel and is made long enough to accommodate the size and clothing of the user and the other of which may be fixed at a relatively short length. Each strap has a free end which carries one of the mating fastener parts which are joined to place the belt in user-restraining position. A time delay device is associated with the retractable strap. A predetermined time after the user has extended the retractable strap the desired amount from the retracting reel, the strap will be locked against further extension but yet many be retracted when the fastener is released or when the belt is pulled so as to create slack adjacent to the reel.

The foregoing and other objects, advantages, and features of the invention and the manner in which the same are accomplished will become more readily apparent upon consideration of the following detailed description of the invention taken in conjunction with the accompanying drawings, which illustrate preferred and exemplary embodiments, and wherein:

FIGURE 1 is a contracted perspective view illustrating a two-strap embodiment of the invention employing a retracting reel;

FIGURE 2 is a vertical sectional view of one type of retracting reel employing a time delay lock in accordance with the invention;

FIGURE 3 is a horizontal sectional view taken along line 3—3 of FIGURE 2;

FIGURE 4 is a view similar to FIGURE 2 but illustrating the reel lock in a different position;

Figure 5:
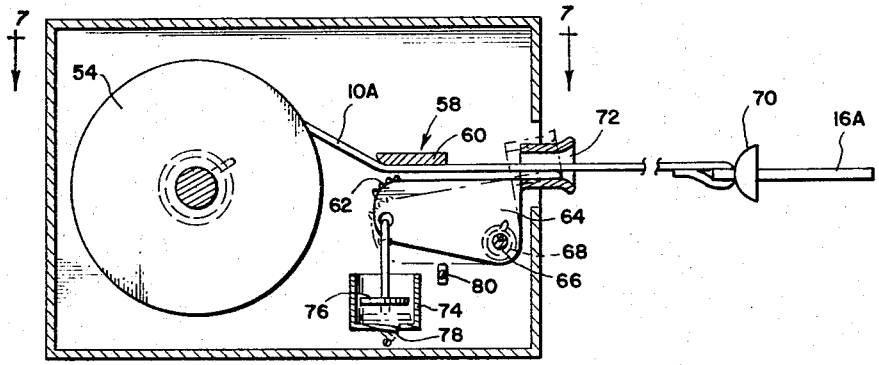
FIGURE 5 is a vertical sectional view of another embodiment of the invention, in which the belt is clamped to prevent extension after a time delay.

Referring to the drawings, and initially to FIGURE 1 thereof, a representative retractable seat belt embodiment of the invention comprises a pair of straps 10 and 12 having free ends attached to the mating parts of a fastener couple 14, which in the form shown comprises an apertured tongue 16 and a buckle 18, both of well known configuration. The buckle is arranged to receive the tongue and to retain the tongue therein until a release lever 20 is lifted so as to permit the withdrawal of fastener abutments from the tongue apertures 22 in a well known manner. The distal end of strap 12 may be anchored to the vehicle floor behind the seat at one side of the occupant, so that the strap may be brought upwardly through the crotch of the seat or around the side of the seat to permit the buckle 18 to be grasped by the user. Strap 12 is of fixed length and may be relatively short so as to be unobtrusive.

Strap 10 has its distal end secured to a self-winding reel 24 rotatably supported in a housing or casing 26, which may be anchored to the vehicle floor at the side of the seat opposite to the anchorage of strap 12. The reel may be a conventional spring-wound type. In the embodiment shown in FIGURE 1 the reel and casing must be capable of sustaining collision forces. The reel may have a hollow arbor 28, which may contain a helical retracting spring 29 and which may be fixed to the associated end of strap 10. The arbor may be rotatably mounted upon the end walls 30 and 32 of the housing and may have a pair of end discs 34 and 36 rotatable therewith. Housing 26 has an opening 38 through which the strap 10 may be extended by grasping the tongue 16. Sufficient strap is wound upon the reel to permit full adjustment for the size and clothing of the user.

It is desired that the strap 10 be readily extensible from the reel to any length suitable for engagement of the tongue 16 with the buckle 18 and yet that the strap be locked against further extension after the strap has been extended to the desired length. For this purpose a timer mechanism is employed which delays actuation of a reel lock for a period of time after initial extension of the strap 10. In the form shown the reel lock comprises a pawl and ratchet mechanism, the ratchet 40 being secured to the arbor 28 of the reel. A pawl and ratchet may be provided at either or both ends of the reel and the pawls may be connected as shown at 39 in FIGURE 3. For simplicity only one of the pawl and ratchet mechanisms will be described, but the other may be identical. The ratchet wheel 40 may be constituted by or fixed to the corresponding end disc of the reel. The pawl 42 may be carried by a lever 44 pivotally mounted upon an end wall 30 of the reel housing, and the lever may be biased, as by a torsion spring 46, so as to engage the pawl with the ratchet. The pawl and the ratchet teeth 48 are shaped to prevent turning movement of the reel in the direction for extension of strap 10 and yet to permit turning movement of the reel in the retracting direction.

When lever 44 is turned (clockwise in FIGURE 2) so as to withdraw the pawl from the ratchet, as shown in FIGURE 4, tongue 16 may be grasped and strap 10 may be pulled so as to withdraw the strap from the reel to any desired length within the reel capacity. In the form shown the pawl is moved away from the ratchet by means of a feeler arm 50 extending from lever 44 into the reel toward the arbor, as shown in FIGURE 3, so as to engage the strap only when sufficient strap has been retracted upon the reel. Continued retraction moves the feeler arm 50 and the lever 44 so as to withdraw the pawl from the ratchet to the position shown in FIGURE 4. This is the position when the strap is fully retracted.

If now the strap 10 is withdrawn from the reel, the biasing spring 46 will tend to return the pawl into engagement with the ratchet. However, it is desired that this engagement be delayed until sufficient strap has been withdrawn to permit coupling of the tongue 16 with the buckle 18. For this purpose a time delay is incorporated into the return movement of the pawl. The timer or time delay device may assume many different forms. In the form shown the time delay is achieved by the engagement of a series of teeth 52 on the lever 44 and a spring detent 54 which engages the teeth and which may be supported upon the end wall 30 of the reel housing. The detent may be contoured as shown so as to increase its resistance to bending when the lever 44 is moving in a direction to return the pawl to the ratchet. The step-by-step frictional engagement of the detent 54 with the serrations or teeth 52 is relied upon to provide the desired delay. The priming or setting of this timing device, in the form shown, is responsive to the diameter of the coiled strap, which increases during retraction of the strap.

The time delay may be made adjustable, as by varying the stroke of lever 44 or the resiliency of detent 54. The time delay is preferably pre-set so that shortly after the time required to withdraw strap 10 and engage tongue 16 with buckle 18, the extension lock becomes effective to prevent further extension of strap 10 from the reel. Even after further extension is prevented, the spring bias of the reel will tend to take up any slack in strap 10, retracting rotation of the reel being permitted by the pawl and ratchet mechanism. After fastening of the belt the belt may be made tighter simply by pulling on strap 10 in the retracting direction so as to create some slack adjacent to the reel which will be taken up automatically. Feeler arm 50 is not made long enough to interfere with extension locking after the strap 10 has been withdrawn by the minimum amount required to engage tongue 16 with buckle 18.

Figure 6:
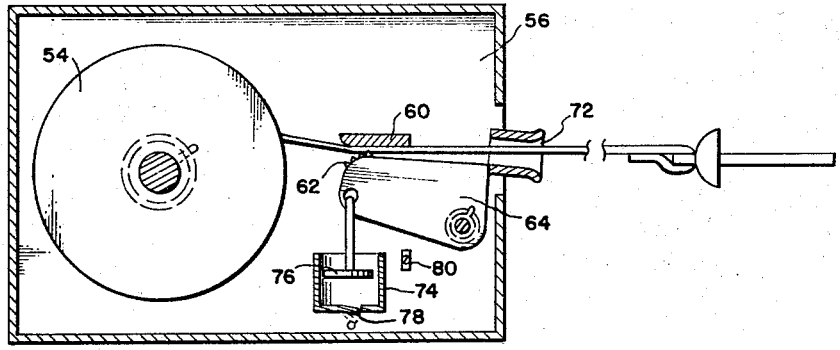
FIGURE 6 is a view similar to FIGURE 5 but illustrating the clamp in a different position.
Figure 7:
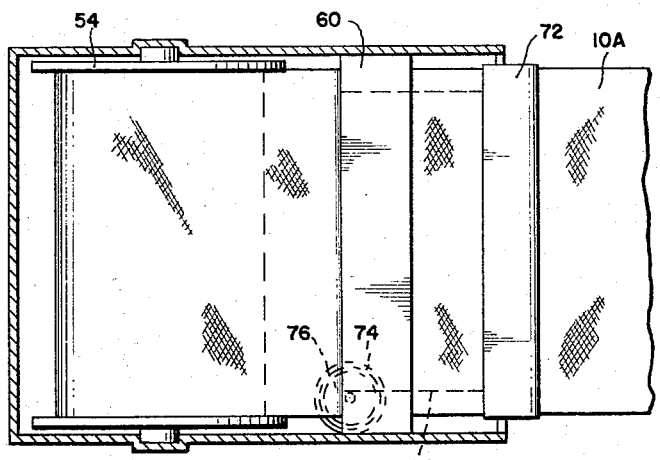
FIGURE 7 is a horizontal sectional view taken along line 7—7 of FIGURE 5.

FIGURES 5–7 illustrate an embodiment of the invention in which the retracting mechanism, for example, a self-winding reel 54, need not withstand collision forces. The strap 10A, which is wound upon the reel, has a fastener part 16A at its free end. The fastener part is shown as a tongue but may be a buckle or other conventional fastener part. Strap 10A and the tongue 16A may be employed in conjunction with another strap, such as a strap 12 having a buckle 18 as shown in FIGURE 1. However, both the strap 10A of FIGURE 5 and the strap 10 of FIGURE 1 may be employed in single strap belts, such as those in which one end of the strap is arranged to be locked to the seat at one side of the user and the fastener part at the other end of the strap is arranged to be engaged with a mating fastener part anchored to the seat at the opposite side of the user. Casing 56 may thus be anchored to the floor of the vehicle or to the seat under appropriate circumstances.

Strap 10A extends past a strap clamp 58, which may have a fixed abutment 60 secured to the housing 56, which rotatably supports the reel 54. Strap 10A moves past abutment 60 as the strap is extended from the reel and the abutment may be contoured so as to minimize friction during normal extension and retraction. The strap clamp may have a movable abutment 62 arranged to move toward abutment 60 so as to clamp the strap therebetween and to move away from abutment 60 so as to release the strap. Abutment 62 may be constituted by a roughened surface of a lever 64 pivotally supported at 66 upon the housing. The lever may be biased, as by means of a torsion spring 68, so as to engage abutment 62 with the strap. The shape of the movable abutment 62 may be involute, for example, so that under the bias of spring 68 only an initial portion of the abutment engages the strap. This relatively light pressure permits retractile movement of the strap, lever 64 tending to turn counterclockwise from the position of FIGURE 6 during retraction of the strap. However, when the strap is pulled so as to extend it, the frictional engagement of abutment 62 with the strap is sufficient to turn the lever 64 clockwise in FIGURE 6 and engage more of abutment 62 with the strap to increase the clamping pressure. This action may be facilitated by utilizing contoured serrations at the surface of abutment 62, the serrations being shaped like the ratchet teeth of FIGURE 2 to impede extensile movement of the strap but not retractile movement. The serrations may have curved surfaces facing tongue 16A and flat surfaces facing the reel 54.

It is desired that strap 10A be freely extensible initially to permit engagement of tongue 16A with a mating fastener part in order to place the belt in user-restraining position, and it is desired that further extension of the strap be prevented after such engagement of the fastener parts. For this purpose the abutment 62 is arranged to be spaced away from the strap when the strap is fully retracted and to engage the strap at the end of a time interval commencing with initial extension of the strap. In the form shown the movement of the abutment 62 away from the strap is accomplished by engagement of the end 70 of tongue 16A with a sleeve 72 through which the strap passes. The sleeve is connected to or formed integrally with the lever 64. When the strap 10A is fully retracted, end 70 of the tongue engages the sleeve, and the spring bias of reel 54 is sufficient to turn lever 64 counterclockwise to the phantom line position shown in FIGURE 5.

In order to delay return of abutment 62 to the strap when tongue 16A is pulled during initial extension of the strap, a suitable timer or time delay device is utilized. In the illustrative form shown this device comprises a pneumatic dashpot 74 having a loosely fitting piston 76 pivotally connected to lever 64. Leakage around the piston is sufficient to permit air to enter behind the piston slowly as lever 64 turns in a clockwise direction, as shown by the full line position in FIGURE 5. Priming or setting movement of the timer piston may be facilitated by providing a flap valve 78 which opens readily during downward movement of the piston but which closes immediately (by suction and/or bias) when the piston 76 moves in the opposite direction. Dashpot devices of this type and equivalents are well known. Thus strap 10A may be readily extended initially, but extensile movement will be prevented a predetermined time after initial extension of the strap. Even after the clamp 58 is engaged the strap may be moved in a retracting direction, and after being fastened the belt may be tightened by pulling on the strap in the retracting direction, so as to create slack which may be taken up automatically by the reel. The time delay may be made adjustable, as by means of a set screw stop 80 which may be positioned to determine the extent to which abutment 62 moves away from the strap.

The timer of FIGURE 5 may be set manually by pressing upon the sleeve 72 just prior to initial extension of the strap, so that semi-automatic operation is possible. Moreover, if the time delay is too short to permit fastening of the belt by a slow-moving user, the timer may be recycled simply by pressing upon the sleeve 72. Recycling may also be achieved simply by releasing the belt so that it retracts. Manual access may be provided for priming the timer lever of FIGURE 2 if desired.

While preferred embodiments of the invention have been shown and described, it will be apparent to those skilled in the art that modifications can be made without departing from the principles and spirit of the invention, the scope of which is defined in the appended claims. For example, within the broader aspects of the invention a wide variety of timing devices may be employed, such as mechanical (e.g. clock train or escapement), pneumatic, hydraulic, electrical, or magnetic. Moreover, the timing devices may be primed in many different ways, such as priming in response to the turning of the reel, priming by means engaging the strap during its extensile or retractile movement, or priming in response to tension in the strap. Accordingly, the foregoing embodiments are to be considered illustrative, rather than restrictive of the invention, and those modifications which come within the meaning and range of equivalency of the claims are to be included therein.

The invention claimed is:

1. A retractable seat belt comprising a strap, means for retracting said strap, said strap being arranged for extension from said retracting means, timing means, and means responsive to said timing means for preventing extension of said strap at a time delayed with respect to the time of initial extension of said strap, said extension-preventing means comprising means for clamping said strap.

2. The belt of claim 1, said clamping means comprising a clamp element biased to clamp said strap but permitting said strap to be retracted.

3. The belt of claim 2, said timing means comprising means for delaying the engagement of said clamp element with said strap.

4. The belt of claim 2, said timing means having means responsive to full retraction of said strap for moving said clamp element away from said strap and priming said timing means.

5. A retractable seat belt comprising a strap, a retraction device, said strap being connected to said retraction device for retraction and extension and having a free end adapted to be grasped for extending the strap across the body of a user to place the strap in user-restraining position, means for preventing extension of said strap after extension thereof to any selected length within a wide range of lengths, said strap having an abutment thereon adjacent to said free end, and means for sensing said abutment when said strap is substantially fully retracted and disabling said extension-preventing means.

6. The retractable seat belt of claim 5, said abutment comprising a strap fastener element attached to said free end.

7. The retractable seat belt of claim 5, said extension-preventing means comprising a strap clamp, said disabling means comprising an element motivated by the force of said retraction device for opening said clamp.

References Cited by the Examiner
UNITED STATES PATENTS

| | | | |
|---|---|---|---|
| 3,074,761 | 11/1963 | Ryan | 297—338 |
| 3,172,700 | 3/1965 | Haas | 297—388 |
| 3,174,704 | 3/1965 | Replogle | 242—107.4 |
| 3,193,327 | 7/1965 | Roe | 297—388 |

FRANK B. SHERRY, *Primary Examiner.*

CASMIR A. NUNBERG, *Examiner.*